June 3, 1941.  A. HOFSTETTER  2,243,846
INTERNAL COMBUSTION ENGINE
Filed April 26, 1939

INVENTOR:
ALFONS HOFSTETTER
by
ATTORNEYS

Patented June 3, 1941

2,243,846

UNITED STATES PATENT OFFICE 2,243,846

INTERNAL COMBUSTION ENGINE

Alfons Hofstetter, Gaggenau, Baden, Germany, assignor to Daimler-Benz Aktiengesellschaft, Stuttgart-Unterturkheim, Germany Application April 26, 1939, Serial No. 270,105
In Germany May 2, 1938

15 Claims. (Cl. 123—33)

This invention relates to Internal combustion engines and particularly to such engines of the precombustion chamber type.

It is an object thereof to provide an improved engine of this type including a burner through which the precombustion chamber contents are expelled into the main combustion space such as the cylinder space, which burner is formed with a series of successively restricted cross-sections defining a series of steps facing toward the precombustion chamber against which the precombustion chamber contents impinge during its flow toward the main combustion space after precombustion occurs. Such steps cause eddies which assure a further atomization of the fuel and thorough intermixture thereof with the air forming part of said contents. Such atomization and improved intermixture causes the engine to operate equally smoothly and quietly at all engine speeds.

Another object is to provide such a burner which has a simple configuration which may be turned so that the cost of manufacture will be very low as compared with previous devices which frequently required many parts some of which involved the provision of intricate passages which increased the cost of manufacture.

Another object is to provide such a burner in which the tread portion of one or more of said steps is undercut to further enhance the atomization and intermixing of the charge.

Another object is to so construct the precombustion chamber burner that it may be made of ordinary steel.

A further object is to so construct the burner that its wall thickness increases toward the main combustion space so that it is thickest where it is subjected to the high temperatures of the main combustion space.

Another object is to provide a burner so formed that due to the distribution of the material of its walls it will serve as a heat storing body for preheating the air as it is driven from the main combustion space to the precombustion chamber.

A further object is to provide a burner so constructed that when the engine is cold and is turning slowly a part of the fuel is sprayed through an opening co-axial with the fuel jet directly into the main combustion space where it is ignited for starting the engine whereas when the engine is heated or speeded up ignition and precombustion will occur in the precombustion chamber.

Another object is to provide such a construction in which the outer end of the burner is provided with a plurality of openings through which the precombustion chamber contents are ejected into the main combustion space, one of which openings is preferably co-axial with the fuel injection nozzle.

Another object is to provide a precombustion chamber construction comprising a sleeve inserted into a member of the engine such as the cylinder head, one end thereof serving to receive the burner, the other end serving to receive the fuel injection nozzle and the intermediate portion thereof serving to form the precombustion chamber.

Other objects will appear from the following description of an illustrative embodiment of the invention taken together with the attached drawing wherein.

Figure 1:
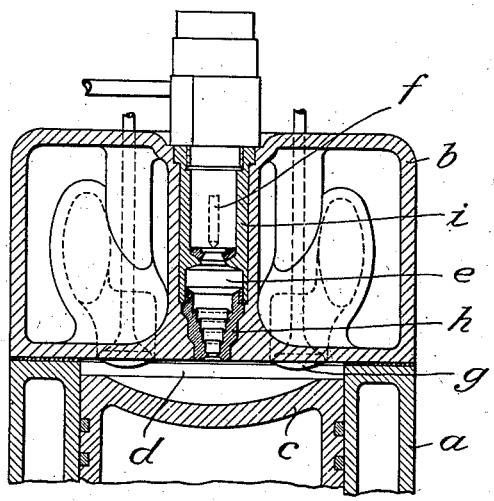
Fig. 1 shows an engine illustrating a precombustion chamber construction made in accordance with the invention.

Referring to Fig. 1, $a$ indicates a cylinder of any desired construction, $b$ the cylinder head, $c$ the piston, and $d$ the main combustion space, whereas $e$ represents the precombustion chamber and $f$ the fuel spray nozzle. As shown, the precombustion chamber is arranged co-axially with respect to the cylinder and is arranged between the intake and exhaust valves $g$. In the form of construction illustrated, the precombustion chamber $e$ is formed within an inserted sleeve $i$ within the upper part of which is housed the fuel spray nozzle $f$, being preferably fastened therein by screw threads formed within said sleeve and upon said fuel nozzle, whereas the lower portion of said sleeve $i$ serves to receive and carry as by screw threads $h'''$ the burner $h$. As will be noted from the drawing, the cross-sectional area of the burner is formed with a series of successively restricted cross-sections, defining a series of steps $h'$, the tread portions of which face upwardly whereas their riser portions are arranged generally vertically. In the form shown, the tread portions of said steps are undercut to provide outwardly and downwardly sloping conical treads. It is of course to be understood that said tread surfaces may be arranged at any desired angle to the axis of the burner including an angle of 90°, in which event the tread surfaces would be planar. As shown, the lower or outer end of the burner $h$ is formed with an opening $k$ for communication with the main combustion space.

As will be apparent, the successive reduction of the cross-section of the burner passage results in a gradual thickening of the wall thickness of the burner so that a greater thickness is available near the main combustion space where the greatest temperatures prevail. Thus, the burner walls themselves may serve as a heat storing body to preheat the air passing therethrough to the precombustion chamber. By suitably stepping down the outside diameter as indicated in the drawing the wall thickness may be adjusted to any amount desired to provide the required heat storing capacity.

In operation, the precombustion chamber contents as they pass from the precombustion chamber to the main combustion space strike the tread surfaces of said step-like conformations and are deflected therefrom in such a way as to form eddies and in other ways to provide a thorough mixing of said contents and further atomization of the fuel particles, whereafter, said contents are ejected through the central bore $k$ into the main combustion space $d$. In this manner, thorough mixing and atomization can be effected without providing a number of intricate passages which set up undue resistance. It will also be noted that the various parts may be turned and therefore may be produced much cheaper than those devices involving complex and tortuous passages.

Figure 5:
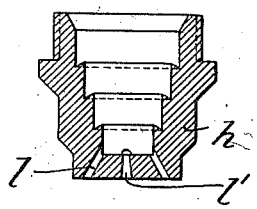
Fig. 5 shows a modified form of burner in which a number of exit passages are provided.

As shown in Fig. 5, a number of exit passages may be provided such as the axial passage $l'$ and annularly and angularly arranged passages $l$.

Figure 2:
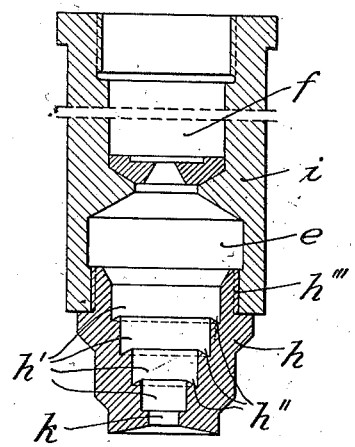
Fig. 2 shows the precombustion chamber insert and the burner, as shown in Fig. 1, on a somewhat enlarged scale.
Figure 3:
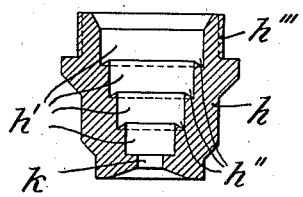
Fig. 3 shows the burner alone.
Figure 4:
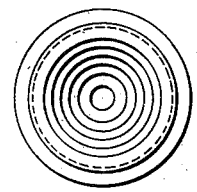
Fig. 4 shows a plan view of the burner.

In certain cases it will be sufficient to form the burner without the conically shaped stepped portions. Furthermore, the precombustion chamber may be arranged at any desired angle with respect to the axis of the cylinder and the exit openings $k$, $l$, and $l'$ may be rearranged and combined in any desired way. Furthermore, the central exit opening $l'$ in the form shown in Fig. 5, or for that matter, also the opening $k$ in Figs. 2 and 3 may be formed conically, preferably in such a manner that its cross-sectional area increases toward the main combustion space so that its smallest cross-section is toward the precombustion chamber. This central exit opening makes possible easy starting of the engine, even in the cold condition, since during starting, if the temperature reached within the precombustion chamber is insufficient to ignite the fuel, a part thereof may be sprayed directly through the central opening into the main combustion space where due to the higher temperatures prevailing there, it will be ignited, thus assuring starting of the engine. As soon as normal operating speed is reached, precombustion will occur in the precombustion chamber since the counter current of air from the main combustion space toward the precombustion chamber may be made sufficiently powerful to prevent the penetration of the fuel jet into the main combustion space so that the usual normal operation of the precombustion chamber engine takes place.

It will be noted that the constructions shown and described will serve admirably to accomplish the objects stated above. It is to be understood, however, that the construction disclosed above is intended merely as illustrative of the invention and not as limiting as various modifications therein may be made without departing from the invention as defined by a proper interpretation of the claims which follow.

I claim:

1. In an internal combustion engine of the fuel injection type having a main combustion space, a precombustion chamber, fuel injection means arranged for injecting fuel into said precombustion chamber, and a burner arranged between said precombustion chamber and said main combustion space, said burner having a passage formed with a series of successively restricted cross-sections defining a series of steps the diameters of which decrease toward said combustion space, whereby the tread portions of said steps face toward the fuel injection means and at least one port connecting said passage with said main combustion space.

2. In an internal combustion engine of the fuel injection type having a main combustion space, a precombustion chamber, fuel injection means arranged for injecting fuel into said precombustion chamber, and a burner arranged between said precombustion chamber and said main combustion space, said burner having a passage formed with a series of successively restricted cross-sections defining a series of undercut steps the diameters of which decrease toward said combustion space, and the tread portions of which steps slope outwardly and downwardly and face toward the fuel injection means and at least one port connecting said passage with said main combustion space.

3. In an internal combustion engine of the fuel injection type having a main combustion space, a precombustion chamber, fuel injection means arranged for injecting fuel into said precombustion chamber, and a burner arranged between said precombustion chamber and said main combustion space, said burner having a passage formed with a series of successively restricted cross-sections defining a series of steps the diameters of which decrease toward said combustion space, whereby the tread portions of said steps face toward the fuel injection means and a plurality of openings connecting said burner passage with the main combustion space, one of which openings extends in the axis of the jet injected by said fuel injection means.

4. In an internal combustion engine of the fuel injection type having a main combustion space, a precombustion chamber, fuel injection means arranged for injecting fuel into said precombustion chamber, and a burner arranged between said precombustion chamber and said main combustion space, said burner having a passage formed with a series of successively restricted cross-sections defining a series of steps the diameters of which decrease toward said combustion space, whereby the tread portions of said steps face toward the fuel injection means and at least one port connecting said passage with said main combustion space, the wall thickness of the burner gradually increasing toward the main combustion space.

5. In an internal combustion engine the combination according to claim 1 in which the steps are arranged substantially concentric with the axis of the fuel jet delivered by said fuel injection means.

6. In an internal combustion engine the combination according to claim 1 in which the said port is arranged substantially within the axis of the fuel jet delivered by said fuel injection means.

7. In an internal combustion engine the combination according to claim 1 in which the steps are arranged substantially concentric with a line extending from the fuel injection means to the said port.

8. In an internal combustion engine of the fuel injection type having a main combustion space, the combination of a precombustion chamber, fuel injection means arranged for injecting fuel into said precombustion chamber, a conduit extending from said precombustion chamber to said main combustion space so constructed that fuel may be injected from said fuel injection means directly into the main combustion space, said conduit being reduced in internal cross-sectional area toward said main combustion space by a plurality of inwardly extending step-like configurations of its inner surface.

9. In an internal combustion engine the combination according to claim 8 in which said inwardly extending step-like configurations are arranged substantially concentric with the axis of the fuel jet delivered by said fuel injection means.

10. In an internal combustion engine the combination according to claim 8 in which said conduit is provided with a port leading into the main combustion space, said port being arranged substantially within the axis of the fuel jet delivered by said fuel injection means.

11. In an internal combustion engine the combination according to claim 8 in which said inwardly extending step-like configurations are arranged substantially concentric with a line extending from the fuel injection means to the said port.

12. In an internal combustion engine of the fuel injection type having a main combustion space, the combination of a precombustion chamber, fuel injection means arranged for injecting fuel into said precombustion chamber, the said precombustion chamber consisting of a section of relatively large diameter adjacent the fuel injection means and a portion which comprises a conduit extending to said main combustion space, the said conduit being reduced in diameter from the diameter of the portion adjacent the fuel injection means toward said main combustion space by a plurality of inwardly extending step-like configurations of its inner surface.

13. In an internal combustion engine the combination according to claim 12 in which inwardly extending step-like configurations are arranged substantially concentric with the axis of the fuel jet delivered by said fuel injection means.

14. In an internal combustion engine the combination according to claim 12 in which the successive diameters of said inwardly step-like configurations decrease substantially the same amount and the smallest diameter comprises a port leading into the main combustion space.

15. In an internal combustion engine the combination according to claim 12 in which said inwardly extending step-like configurations are formed in a separate inserted member.

ALFONS HOFSTETTER.